United States Patent [19]

Michon

[11] Patent Number: 4,807,038
[45] Date of Patent: Feb. 21, 1989

[54] CID IMAGE SENSOR WITH PARALLEL READING OF ALL CELLS IN EACH SENSING ARRAY ROW

[75] Inventor: Gerald J. Michon, Waterford, N.Y.

[73] Assignee: General Electric Company, Schenectady, N.Y.

[21] Appl. No.: 167,809

[22] Filed: Mar. 14, 1988

[51] Int. Cl.[4] .............................................. H04N 3/14
[52] U.S. Cl. ............................ 358/213.31; 358/213.29
[58] Field of Search ...................... 358/213.31, 213.29, 358/213.26, 212; 357/30 G, 30 H

[56] References Cited

U.S. PATENT DOCUMENTS

| | | | |
|---|---|---|---|
| 4,316,221 | 2/1982 | Swab | 358/213.31 |
| 4,434,441 | 2/1984 | Ishizaki et al. | 358/213.31 |
| 4,471,227 | 9/1984 | D'Ascenzo | 358/212 |
| 4,689,688 | 8/1987 | Michon | 358/213.31 |

Primary Examiner—Jin F. Ng
Assistant Examiner—Stephen Brinich
Attorney, Agent, or Firm—Geoffrey H. Krauss; James C. Davis, Jr.; Marvin Snyder

[57] ABSTRACT

A charge injection device image sensor, having increased sensitivity and dynamic range, utilizes a two-dimensional array of cells having m rows each with n cells arranged in n columns. A video preamplifier is connected to each associated column to amplify, in parallel, video signals from that one column, responsive to all of the n cells along a particular one of the m rows being simultaneously enabled. The rows are scanned in mutually-exclusive fashion. Each of the n amplified column signals is separately stored. The stored column signals are sequentially readout to provide the sensor video output signal.

17 Claims, 2 Drawing Sheets

CID IMAGE SENSOR WITH PARALLEL READING OF ALL CELLS IN EACH SENSING ARRAY ROW

BACKGROUND OF THE INVENTION

The present invention relates to charge injection device (CID) image sensors and, more particularly, to a novel integrated CID image sensor having parallel readout of all of the cells along each row of the sensing array.

It is well known that the sensitivity of a charge-injection-device (CID) sensor is limited by the signal-to-noise ratio of the device signals. Improved sensitivity, allowing wider dynamic range and concomitant operation in lower incident light levels, requires that the temporal noise level be significantly reduced. The temporal noise in a CID image sensor is typically determined by the Johnson noise of both the row select multiplexer and the video amplifier, and by the capacitance associated with the signal sense line. Present CID image sensors incorporate a current sensing scheme which tends to peak the resulting noise current at a relatively high frequency. Because row selection is accomplished by multiplexing, wherein a multiplexer connects a different one of the row lines to the input of the single video amplifier, the capacitance attributable to the signal line is relatively large. Use of a preamplifier transistor at the end of each array row has proved to be highly beneficial in reducing the capacitance and/or noise attributes associated with the peripheral circuitry for selecting that one cell of a CID sensing array to provide an output at any particular instant; this arrangement to reduce the temporal noise level and thus provide increased sensitivity and dynamic range, is described and claimed in my U.S. Pat. No. 4,689,688, issued Aug. 25, 1987, which is assigned to the assignee of the present invention and is incorporated herein in its entirety, by reference. It is still desirable to further decrease temporal noise, improve sensitivity and increase the dynamic range of CID image sensors.

BRIEF SUMMARY OF THE INVENTION

In accordance with the invention, a charge injection device (CID) image sensor having increased sensitivity and dynamic range utilizes: a two-dimensional array of cells having a plurality m of rows each having a like plurality n of cells arranged in n columns; peripheral means for cyclically sequentially (a) resetting all cells along all of the plurality n of columns, and (b) for then sequentially scanning each of the plurality n of rows to cause all of the plurality n of cells along that row then scanned to substantially simultaneously generate a signal voltage, on an associated column line, responsive to the intensity of photon flux having fallen on that cell after reset; a plurality n of voltage preamplifier means each for amplifying the signal voltage on one associated column line; a plurality n of means each for storing the amplified signal voltage from one associated column line preamplifier means; and means for sequentially reading out the amplified signal voltage stored in sequential ones of the plurality n of storing means, to provide at least one video signal representative of the photon flux intensity to which the cell array responds.

In a presently preferred embodiment of my novel image sensor in which all of the plurality n of cells along a selected one of the rows are simultaneously readout in parallel, each into an associated one of the like plurality n of storage means, and a video signal for that row is then obtained by sequentially reading each of the n storage means, a readout is also provided of a no-row-selected set of signals which are related to the KTC noise in each column. The array is readout, in the absence of an external light input, to obtain a video voltage signal related to the fixed pattern noise therein. Alternatively, the fixed pattern noise can be readout from any row immediately after injection, prior to the integration of light-generated signals. Subsequent subtractive and/or correlated-doubling-sampling means use these signals to decrease the fixed pattern noise and KTC noise contribution to a final processed video output signal.

Accordingly, it is an object of the present invention to provide a novel charge-injection-device image sensor utilizing parallel readout of the charge in each row of the cells in the sensor array.

This and other objects of the present invention will become apparent upon a reading of the following detailed description, when considered in conjunction with the associated drawings.

DETAILED DESCRIPTION OF THE INVENTION

Figure 1:
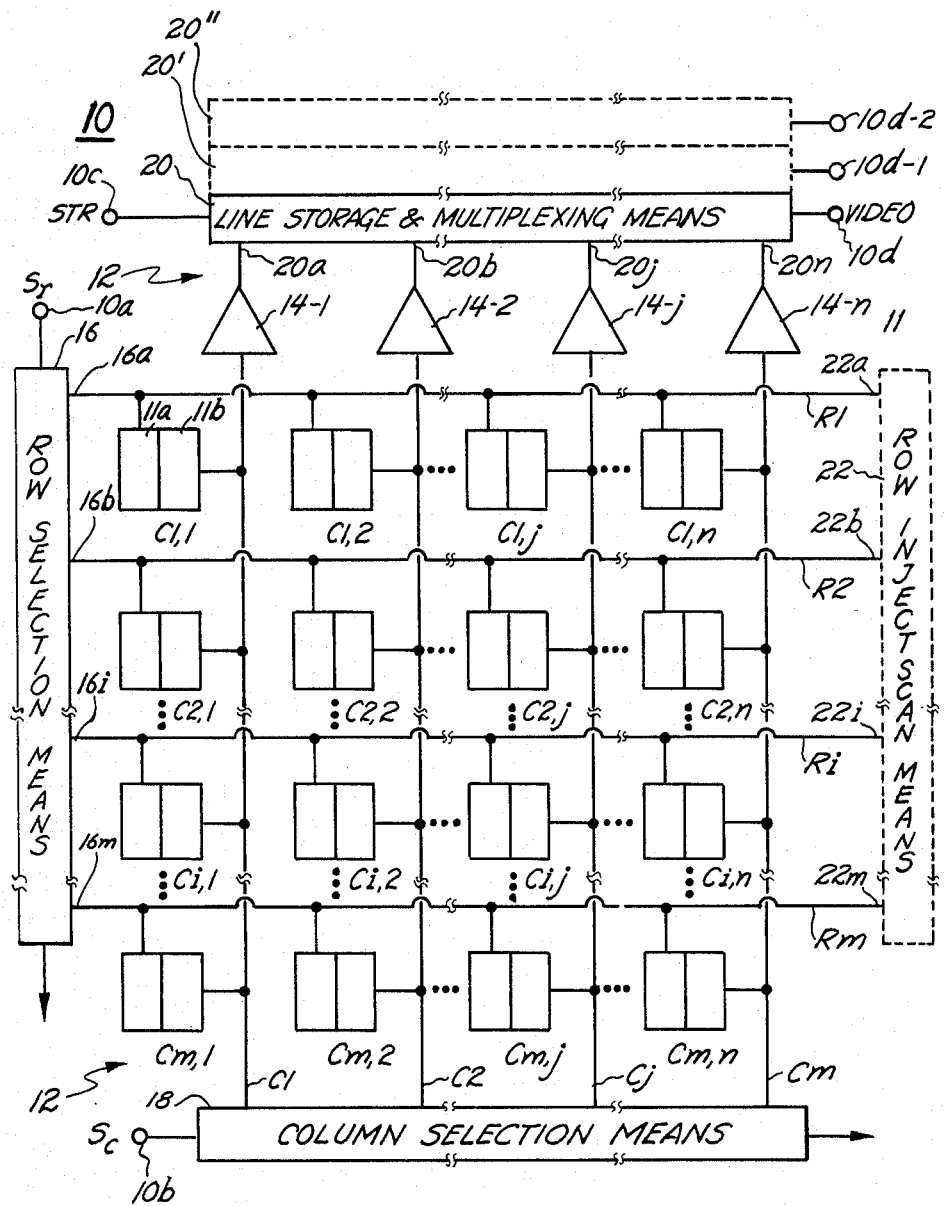
FIG. 1 is a schematic block diagram of a generic CID imaging array and peripheral electronics in accordance with principles of the present invention.

Referring initially to FIG. 1, CID imaging sensor 10 includes an array 11 formed of a plurality of cells arranged in m rows, each having another plurality n of individual cells, e.g. a m×m array of cells C1,1 through Cm,n. The array 11 is utilized with peripheral electronics means 12 and with a plurality n of video amplification means 14, each assigned to an associated one of the n columns of the array 11. Each of the cells Ci,j (where $1 \leq i \leq m$ rows and $1 \leq j \leq n$ columns) is, as well known to the CID imaging arts, comprised of a region of a semiconductor member insulatively overlayed with a pair of coupled electrodes; each row electrode, here illustratively the electrode 11a on the left side of each cell, is connected one of the plurality m of row lines R1, R2, ..., Ri, ..., Rm, while each of the remaining electrodes, here illustratively the right-hand electrodes 11b, are column electrodes connected to an associated one of a plurality n of column lines C1, C2, ..., Cj, ..., Cn.

Peripheral electronics means 12 includes a vertical (row) scan means 16, which cyclically receives a row strobe $S_r$ pulse (at a sensor input 10a) to start a sequential energization of individual outputs 16a, 16b, ..., 16i, 16m to actuate the associated row line R1, R2, ..., Ri, ..., Rm from a holding amplitude (say $-V_r$ volts on electrodes 11a) to a transfer amplitude (say $\simeq 0$ volts). A horizontal (column) scan means 18 cyclically receives a column strobe $S_c$ (at a sensor input 10b) which (a) causes all of the column outputs 18a, 18b, ..., 18j, ..., 18n to be enabled to a reset amplitude (say $\simeq 0$ volts on electrodes 11b) to inject all charge from the column (right-hand) portion of each cell and clear the array row (which is at the transfer amplitude) for a next-subsequent scan, and (b) then causes all of the column lines C1, C2, ..., Cj, ..., Cn to be simultaneously returned to, or floated at, an operating amplitude $V_c$, where $0 \leq V_c \leq V_r$. Then, each energization of any row line to the transfer amplitude causes the stored photon-induced charge (collected since the last reset of each cell) to transfer, in parallel, from the potential well under each row electrode 11a of all cells on that row (then energized to the transfer amplitude), to the potential well under the column electrode 11b of that same cell. A change in the voltage on the associated column line occurs, with the change having an amplitude substantially equal to the signal charge induced on the column n line by that cell Ci,j, divided by the column line capacitance. This change in signal voltage is amplified by the associated column amplifier means 14.

In accordance with one principle of the present invention, the time available for amplification of the signal voltage, induced by any pixel along a particular row, is now equal to the row scan time, since all of the amplifiers operate in parallel. Higher imaging sensor sensitivity results, as noise bandwidth is minimized by maximization of amplification time. The temporal noise in CID image sensors is typically dominated by the noise level of the amplifier; for the MOSFETs amplifier devices used, the noise level is basically determined by the Johnson (resistive) noise voltage $E_n = (4KT\Delta F/G_m)^{178}$, where K is Boltzmann's constant, T is the absolute temperature, $\Delta F$ is the amplifier noise bandwidth and $G_m$ is the equivalent forward transconductance of the entire preamplifier. It will be seen that transconductance and noise bandwidth are the only two parameters which can be selected in the design of an imager operating at ambient temperature. Because the device $G_m$ is proportional to the square root of the drain current, and the amplifier gain ($G_m \times R_L$, where $R_L$ is the load resistance) is inversed proportional to the square root of drain current, it is possible to not only reduce the effective noise bandwidth by an increase in amplifier gain, with an increase in amplifier load resistance, but to also simultaneously reduce amplifier power consumption. Utilizing typical integrated circuitry amplifiers having gains on the order of 100, a power consumption of about 50 microwatts per amplifier can be achieved. In an imager having n=1300 amplifiers, a total power consumption of 65 millowatts, for all amplifiers, is completely acceptable. Illustratively, in this same 1300 column sensor, a total of m=1000 rows are utilized.

In accordance with another principle of the present invention, the output of each column preamplifier means 14 is connected to a like input 20a, 20b, ..., 20j, ..., 20n of a line storage and multiplexing means 20. Means 20 stores each of the n column signal voltages for the row then selected, responsive to a storage strobe STR signal pulse (at a sensor input 10c) which occurs substantially at the end of each row select time interval (after the maximum amplification time for the parallel-read-out signal voltages has occurred). The storage strobe signal also commences a sequential multiplexing operation wherein the stored signal amplitudes are sequentially readout, from the associated storage locations. Thus, a first storage location, corresponding to the first input 20a, is readout; the second storage location, corresponding to the second input 20b is then readout, and so on. The j-th location, corresponding to the j-th input 20j is subsequently readout; this process continues until the last storage location, corresponding to the last column signal input 20n is readout. This sequentially-read signal is an output video signal appearing at a sensor output 10d. A serial sequential signal readout, forming the video signal for each row (e.g. the k-th row), thus occurs after the particular row, from which the video signal is obtained, is un-selected and during the time interval during which the next, vertically-lower row (e.g. the k+1-st row) is selected and the signals therefrom are amplified.

A row injection scanner means 22, having a plurality m of outputs 22a, 22b, ..., 22i, ..., 22m, each connected to an associated row line, R1, R2, ..., Ri, ..., Rm, can be utilized to inject the charge from each of the cells Ci,x, where x are all of the n columns along the i-th row, to be cleared by charge injection immediately after the cessation of the read-out time interval for that i-th row. In this manner, the cyclic charge injection provides a substantially equal time for collection of photon-induced charges in the cells of each of the plurality m of rows.

Figure 2:
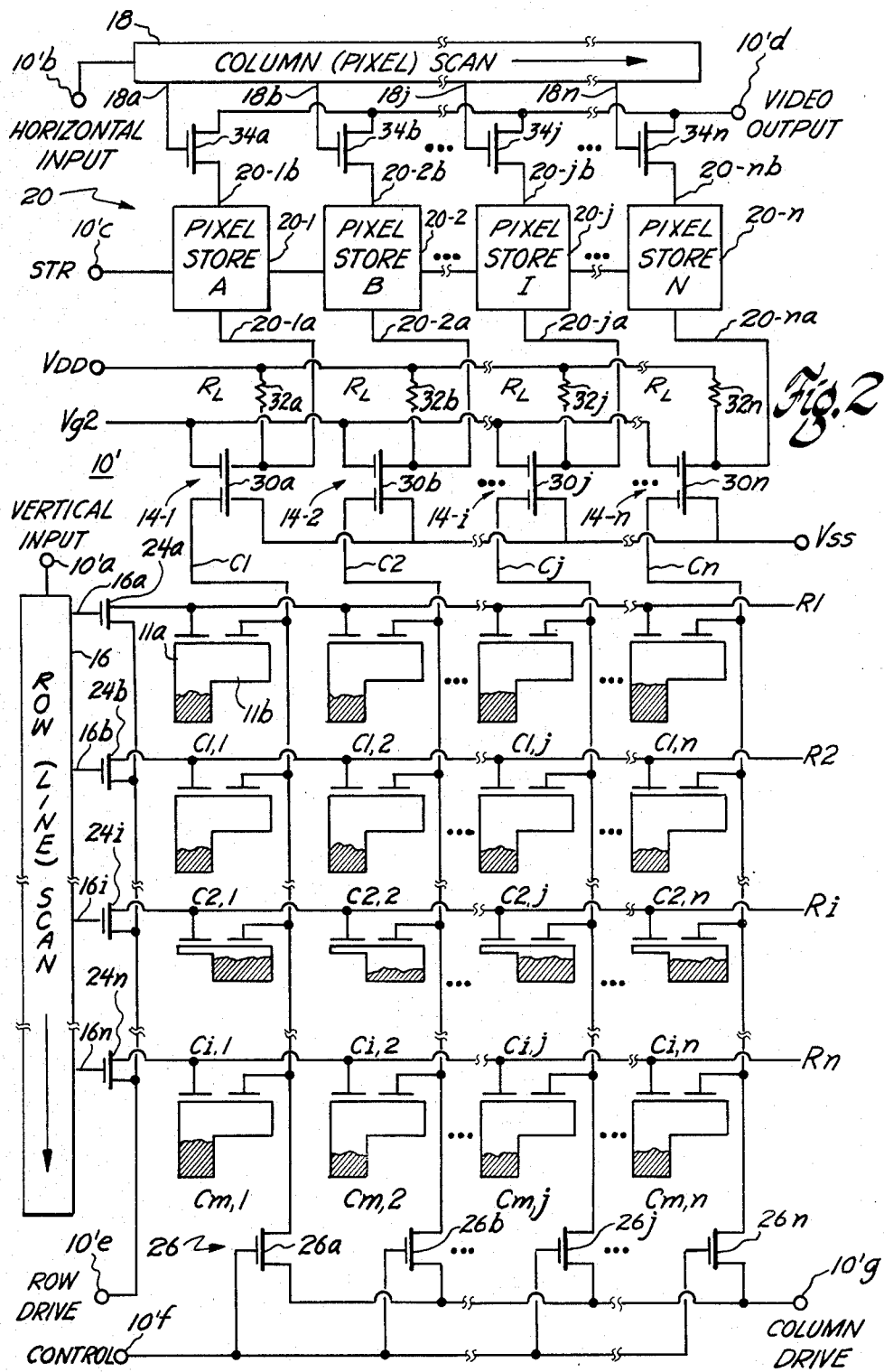
FIG. 2 is a more detailed schematic block diagram of a presently preferred embodiment of a CID image sensor of the present invention.

Referring now to FIG. 2, a presently preferred embodiment is described in somewhat greater detail, although sensor 10' is again illustrated with only a four-by-four array 11 of pixels Cl,l through Cm,n. Each row line R1, R2, ..., Ri, ..., Rm is coupled to the source electrode of an associated one of a plurality m of row switching devices 24a, 24b, ..., 24i, ..., 24n, all having their drain electrodes coupled in parallel to a row drive input 10'e. The gate electrode of each of devices 24 is coupled to an associated output 16a, 16b, ..., 16i, ..., 16n of the row(line) scan means 16 and is mutually-exclusively energized in cyclic sequence responsive to a vertical input pulse at vertical scan input 10'a. The row lines R are operated at a row voltage which is of higher magnitude then the magnitude of the voltage on column lines C, so that the signal charge is stored under the row-connected electrodes (associated with the left-hand row potential wells 11a) in all of the un-selected rows. Only when that one particular row scan output, e.g. output 16i, is selected does the associated row switching device (24i) change the potential on the associated row line (Ri) to a substantially zero magnitude (as shown for the potential well 11a' of cells Ci,x, (for $1 \leq X \leq n$), which causes the signal charge stored under the row electrodes to move rightwardly to a position under the column-connected electrodes 11b'.

Connected to each of the column line C1, C2, ..., Cj, ..., Cn are column reset devices 26a, 26b, ..., 26j, ..., 26n, each having its control electrode connected to a control input 10'f and having its controlled-conduction circuit connected from the associated column line, in parallel to a column drive potential input terminal 10'g. After the storage means operates, the columns are all reset to an intermediate potential level $V_c$, where $0 \leq V_c \leq V_r$, which potential $V_c$ is provided at the column drive input, by a reset control pulse at terminal 10'f. After resetting all column electrodes, the column electrodes are allowed to float at the column voltage $V_c$. Periodically, a sample of the KTC noise, introduced on column electrodes C, by the column-resetting operation, is taken for subsequent subtraction from the video output signal a correlated-double-sampling means (not shown, but well known to the art). Advantageously, the noise sampling operation can be carried out at the termination of each scan of the m rows, and prior to the commencement of the next m-row scan.

When any particular row is selected, by reduction of the row electrode potential substantially to zero, the charge under the row electrode is transferred to a position under the column electrode (i.e. into the column charge storage capacitor), for all cells along that same row, as illustrated for the i-th row in FIG. 2. A voltage is now present at each column line, which is determined substantially by the quotient of (a) the charge transferred from row capacitor to column capacitor, and (b) the column capacitance. This voltage is applied to the input gate electrode of a cascade-connected pair of MOSFETs 30 in each of the preamplifiers 14. Thus, the signal voltage from cell Ci,1 appears on column line C1 and at the gate electrode of the FET cascode 30a of amplifier 14-1, while the signal voltage from cell Ci,2 appears on column line C2 connected to the input gate of device 30b in amplifier 14-2, and so forth. The gate electrodes of all second stage devices is connected in parallel to a substantially constant potential Vg2. The amplified signal appears across the associated one of load resistors 32a-32n, each having a load resistance $R_L$. I have chosen the cascode connection as it has, compared to a common-source FET amplifier, a lower input capacitance and higher output impedance. The amplified signal is coupled to the associated one of storage means input 20a-20n. Each of amplifiers 14 has a noise bandwidth which is held to a minimum, consistent with the row (line) readout time interval of the system in which imaging sensor 10' is utilized.

The amplified pixel signals, at inputs 20, are strobed into the associated pixel store means 20-1 through 20-n, respectively, by the commonly-applied storage strobe STR signal pulse at input 10'c, which pulse occurs substantially at the end of each line readout time interval. After storage, the column reset control terminal 10'f is energized and all the column lines reset; the next row (e.g. the i+1-st row) line is then energized and, while the cells along that row are providing signals for amplification, the values from the previous (e.g. the i-th) row are sequentially readout from pixel storage means 20, by sequentially coupling each sequential one of the pixel storage means outputs 20-1b through 20-nb, via a sequentially and mutually-exclusively enabled one of multiplex switching means 34, to the video output terminal 10'd. Thus, responsive to a horizontal input pulse at horizontal input terminal 10'b, the column pixel scan means 18 sequentially and mutually-exclusively energizes its outputs 18a, 18b, ..., 18j, ..., 18n, to mutually-exclusively enable conduction first through device 34a, coupling the first pixel storage means output 24-1b through to the video output, then mutually-exclusively enabling the second multiplex-switching device 34b to conduct, to connect the second pixel storage means output 24-2b to the video output, and so on. The speed of the multiplexing pulse through the column scan means 18 is adjusted to cause all of the n column storage means to be scanned out prior to the next storage strobe STR pulse at input 10'c. It will be understood that fixed pattern noise is removed from the video signal by subtraction of that noise, which is read from the array after all signal charge has been cleared, as by an injection operation utilizing the row injection scan means 22, shown in FIG. 1, and the like. The use of a separate row inject scanner means 22 is also advantageous in that the integration time interval (the time interval between charge injection time and readout time) can be electronically controlled, for providing electronic exposure control and similar functions. It will also be understood that, as seen in FIG. 1, it is possible to provide color video signals by integrating color filters with the array to form a single integrated-circuit chip color sensor wherein the various color signals are separated on-chip and are brought out to separate outputs. Additional line storage and multiplexing means 20' and 20" are utilized to provide each of two additional color video signals at an additional video signal output 10d-1 to 10d-2. Thus, if a red-blue-green color strip system is utilized, each of the separate red-blue-green color video signals is available at respective video output terminals 10d, 10d-1 or 10d-2. It is also possible to separate checkerboard color filter signals within an integrated circuit chip, by reassigning the output ports for each row readout. The use of parallel output ports results in a lower operating frequency than the use of a single output port, which can be an additional advantage, as the noise bandwidth is further reduced.

While one presently preferred embodiment of my novel CID image sensor, with parallel reading of all cells in each sensing array row, has been illustrated in considerable detail herein, many modifications and variations will now become apparent to those skilled in the art. It is my intent therefore to be limited only by the scope of the appending claims, and not by the specific details and instrumentalities presented by way of explanation of the preferred embodiment herein.

What I claim is:

1. A charge-injection-device (CID) image sensor having increased incident-photon-flux sensitivity and dynamic range, comprising:

a two-dimensional array of cells, each for temporarily storing electrical charge generated responsive to the magnitude of photon flux incident upon that cell, the array arranged in a plurality m of rows each having a plurality n of cells arranged in n columns;

peripheral electronics means for cyclically sequentially (a) resetting all cells along all of the plurality n of columns, and (b) for then sequentially scanning each of the plurality m of rows to cause all of the plurality n of cells along that row then selected to in parallel and substantially simultaneously generate a signal voltage, on an associated column line, responsive to the intensity of photon flux received by that cell after being reset;

a plurality n of voltage preamplifier means each for amplifying the signal voltage on one associated column line;

a plurality n of storage means each for storing the amplified signal from an associated preamplifier means; and means for sequentially reading out the amplified signal voltage stored in sequential ones of all of the storage means, to provide at least one video signal representative of the pattern of light incident upon the array.

2. The sensor of claim 1, wherein each preamplifier means comprises: at least one MOSFET device; and a load resistance coupled to said at least one device and across which appears the amplified signal for that column.

3. The sensor of claim 1, wherein the equivalent transconductance ($G_m$) of the preamplifier means and the magnitude of said load resistance are selected to provide in each of the preamplifier means a desired set of at least two of: gain, effective noise bandwidth and power consumption.

4. The sensor of claim 1, wherein each preamplifier means comprises: a plurality of sequentially-connected MOSFET devices; and a load resistance coupled to the last of said devices and across which appears the amplified signal for that column.

5. The sensor of claim 4, wherein the equivalent transconductance ($G_m$) of the preamplifier means and the magnitude of said load resistance are selected to provide in each of the preamplifier means a desired set of at least two of: gain, effective noise bandwidth and power consumption.

6. The sensor of claim 4, wherein each preamplifier means comprises a pair of MOSFET devices connected in a cascode configuration.

7. The sensor of claim 6, wherein the equivalent transconductance ($G_m$) of the preamplifier means and the magnitude of said load resistance are selected to provide in each of the preamplifier means a desired set of at least two of: gain, effective noise bandwidth and power consumption.

8. The sensor of claim 1, wherein all of said storage means store the associated amplified signal responsive to a common storage strobe signal.

9. The sensor of claim 8, wherein the common strobe signal is generated substantially at the end of each time interval during which charge is readout from cells along any of the rows.

10. The sensor of claim 9, wherein the sequential reading means is enabled once after each generation of the common strobe signal.

11. The sensor of claim 1, further comprising means for injecting the charge stored within each cell along any selected row.

12. The sensor of claim 11, wherein the row injecting means sequentially selects for injection that row having just been read.

13. The sensor of claim 12, wherein the row injecting means is controllable to set a variable integration time interval, between the time of injection and the time of readout.

14. The sensor of claim 1, further comprising: means for causing at least a portion of the array to be sensitive to each of a plurality of different wavelengths of incident photon flux; each of the preamplifier and storage means associated with the different-wavelength-sensitive array cells causing a like plurality of different sets of stored amplified signals to be available; and means for causing each different set of signals to be separately read out as a separate video color signal.

15. The sensor of claim 14, wherein the sensor is sensitive to three different visible wavelengths.

16. The sensor of claim 1, wherein the array has on the order of m=1000 rows and on the order of n=1300 columns.

17. The sensor of claim 1, wherein said array and at least a portion of said peripheral electronics, voltage preamplifier, storage and sequentially reading means are integrated into a single semiconductor circuit chip.

* * * * *